United States Patent [19]
Gutman

[11] Patent Number: 5,207,097
[45] Date of Patent: May 4, 1993

[54] GEAR TESTER WITH ACTUATOR SUPPORTED PLATFORM

[75] Inventor: Yevsey Gutman, Minneapolis, Minn.

[73] Assignee: GEI Systems, Inc., Minneapolis, Minn.

[21] Appl. No.: 928,808

[22] Filed: Aug. 12, 1992

[51] Int. Cl.⁵ .................. G01M 13/02; B23Q 3/04; B23Q 3/06; B23Q 1/04
[52] U.S. Cl. .................. 73/162; 33/501.13; 33/573; 269/71
[58] Field of Search ............ 33/501.13, 573; 73/162; 269/71, 73

[56] References Cited

U.S. PATENT DOCUMENTS

| | | | |
|---|---|---|---|
| 1,981,693 | 11/1934 | Firestone et al. | 33/501.13 |
| 3,099,901 | 8/1963 | Hunkeler | 51/26 |
| 3,176,512 | 4/1965 | Hediger | 73/162 |
| 3,321,840 | 5/1967 | Pedersen | 33/179.5 |
| 3,404,443 | 10/1968 | Cinanni | 29/90 |
| 3,496,490 | 2/1970 | Weinert et al. | 33/501.13 |
| 3,528,286 | 9/1970 | Bergemann et al. | 73/162 |
| 3,583,072 | 6/1971 | Muller | 33/501.13 |
| 3,604,120 | 9/1971 | Muller | 33/501.13 |
| 3,611,800 | 10/1971 | Howlett et al. | 73/162 |
| 3,686,801 | 8/1972 | Ellwanger | 51/215 R |
| 3,712,000 | 1/1973 | Spear | 51/287 |
| 3,717,958 | 2/1973 | Ellwanger et al. | 51/26 |
| 3,795,143 | 3/1974 | Deprez et al. | 73/162 |
| 3,829,978 | 8/1974 | Basin et al. | 269/71 |
| 3,990,689 | 11/1976 | Eklund, Sr. | 269/71 |
| 4,024,757 | 5/1977 | Raess et al. | 73/162 |
| 4,193,317 | 3/1980 | Oono et al. | 269/71 |
| 4,262,891 | 4/1981 | Kinney | 269/71 |
| 4,317,560 | 3/1982 | Troyer | 269/71 |
| 4,502,457 | 3/1985 | Marron | 269/71 |
| 4,571,799 | 2/1986 | Chitayat | 269/71 |
| 4,618,256 | 10/1986 | Bartolomeo | 356/23 |
| 4,682,766 | 7/1987 | Barkley | 269/71 |
| 4,705,447 | 11/1987 | Smith | 269/71 |
| 4,767,109 | 8/1988 | Raketich | 269/71 |
| 4,822,014 | 4/1989 | Buchler | 269/71 |
| 4,831,872 | 5/1989 | Huang et al. | 73/162 |
| 4,896,869 | 1/1990 | Takekoshi | 269/71 |
| 5,105,552 | 4/1992 | Bielle | 33/573 |

FOREIGN PATENT DOCUMENTS

| | | | |
|---|---|---|---|
| 2815407 | 10/1979 | Fed. Rep. of Germany | 269/71 |
| 0250988 | 10/1987 | Fed. Rep. of Germany | 33/501.13 |
| 0448403 | 3/1950 | Italy | 33/501.13 |
| 0073680 | 6/1978 | Japan | 269/71 |
| 0093325 | 7/1981 | Japan | 269/71 |
| 0171229 | 10/1983 | Japan | 269/73 |
| 0188037 | 8/1986 | Japan | 269/71 |
| 0180447 | 8/1962 | Switzerland | 33/501.13 |
| 0373568 | 6/1973 | U.S.S.R. | 73/162 |
| 0681719 | 10/1952 | United Kingdom | 73/162 |
| 0869771 | 6/1961 | United Kingdom | 73/162 |

OTHER PUBLICATIONS

Oerlikon Spriomatic contex T20 CNC Bevel and Hypoid Gear Tester by Dr. Hermann J. Stadtfeld, Dec. 1990.

(List continued on next page.)

Primary Examiner—William A. Cuchlinski, Jr.
Assistant Examiner—Diego F. F. Gutierrez
Attorney, Agent, or Firm—Kinney & Lange

[57] ABSTRACT

A gear suspension system is disclosed that permits movement of a gear, such as a spiral bevel or hypoid gear relative to its pinion with six degrees of freedom. The gear suspension system includes a support structure with a moveable carriage mounted thereon. The carriage is supported by six actuators interconnected together to form three connection joints to the support structure and three connection joints to the gear carriage. The gear is mounted to the carriage for rotation about a central axis. The actuators allow the gear mounting distance, the shaft angle, the H position and the V position to be adjusted. In addition, the actuators further allow the gear carriage to be rotated about the central axis and to be rotated about an axis that is parallel to an axis of a pinion and passing through the central axis.

11 Claims, 4 Drawing Sheets

OTHER PUBLICATIONS

Gleason No. 512 Hypoid Tester, Nov. 1969.

Bevel Gear Lapping Machines LKR 851 and LKR 1600, as well as Bevel Gear Running Testers GKP 851 and GKP 1600 by Klingelnberg (Date Unknown).

Bevel Gear Running Testers by Klingelnberg (Date Unknown).

General Line Brochure, The Gleason Works, 1990.

The Institute of Mechanical Engineers, *A Platform with Six Degrees of Freedom*, by D. Stewart, Proceedings 1965–1966—vol. 180, Part 1, No. 15.

*Understanding the 513 Bevel Gear Test Machine*, The Gleason Works, pp. 1-1, 4-2 through 4-3 and accompanying figures (Date Unknown).

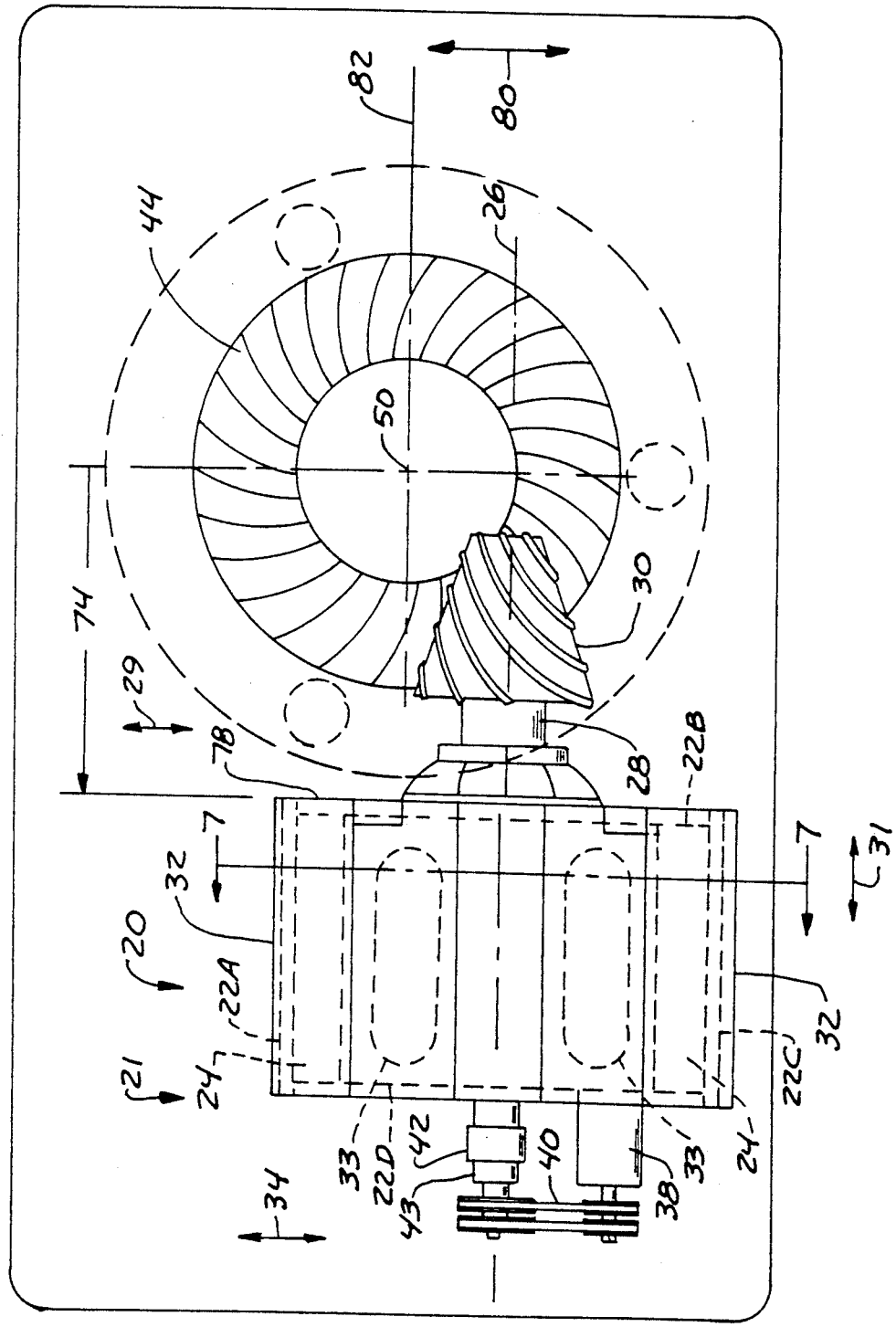

GEAR TESTER WITH ACTUATOR SUPPORTED PLATFORM

CROSS-REFERENCE TO RELATED APPLICATIONS

Reference is made to my co-pending applications Ser. No. 07/928,900, filed Aug. 12, 1992 entitled RIGID TEST TABLE FOR GEAR SETS; Ser. No. 07/929,151, filed Aug. 12, 1992 entitled CONTROLLABLE GEAR TESTING SYSTEM; and Ser. No. 07/929,835, filed Aug. 12, 1992 entitled GEAR TESTER CONTROLLING SELECTED DEGREES OF FREEDOM.

BACKGROUND OF THE INVENTION

The present invention relates to a gear tester for controlling the position of mating gears, such as hypoid or spiral beveled gears to verify the quality of a given gear set under fixed and known mounting conditions to determine sensitivity of the gears to various programmed misalignments, changes in mounting conditions and the like which simulate deflections during use.

In the prior art, it has long been the practice to test on a substantially 100% basis, spiral bevel and hypoid gears to determine running qualities, such as tooth-bearing contact. It has further been known to use machines for running sets of bevel or hypoid gears together to determine optimum running positions of one gear relative to another. Such a device is shown in U.S. Pat. No. 3,795,143. The device in this patent permits adjusting the axes of the pinion and gear relative to each other for the offset of axes, as well as the positioning of the degree of intersection of the gear. However, this procedure involves the use of large slides and manual controls for the final positioning.

In order to determine the effect of various tolerances or differences in gear and pinion positions, the need has existed for accurately controlling the position of the gear in several degrees of freedom, while determining loads in the gear as well as simultaneously determining other performance factors of the gears. Such performance factors may be noise, the "footprint" of the pinion on the gear, and deflection that might occur on the gear itself caused by loading on the gear. Thus, measuring the loads on the gear and the controlled degrees of freedom is beneficial in determining factors that may be necessary for housing designs to minimize deflections and alignment problems. Finally, in matched sets of gears, an optimum running position of a pinion and the gear can be determined and used for final adjustment when assembled in a housing for use so that other than the nominal axial offset and positioning of the gears can occur.

Four degrees of freedom are usually needed for providing alignment between a stationary pinion and a pinion spindle and the gear and the gear spindle. My co-pending application entitled CONTROLLABLE GEAR TESTING SYSTEM, filed on the same day as the present application, discloses a gear testing system with up to four degrees of freedom for positioning the gear relative to a fixed stationary pinion. Specifically, this system permits controlling movement of the gear along the gear rotational axis, which position is essentially the gear mounting distance that determines the backlash ("Q"); controlling the shaft angle ("S"), which is the angle of the axis of the gear shaft or spindle relative to the axis of rotation of the pinion; controlling the hypoid or spiral bevel offset, which is the offset of the pinion axis from the gear axis in the plane passing through the gear axis and parallel to the spindle rotational axis, commonly called a vertical position ("V"); and the position of the gear axis along the pinion axis, which is commonly called the pinion axial position ("H") and can generally be referred relative to a reference plane perpendicular to the pinion spindle axis, generally the plane surface supporting the back surface of the pinion. The terminology for horizontal and vertical positions are traditional references used in describing relative pinion and gear positions and are not intended to be limitations of the present invention.

SUMMARY OF THE INVENTION

The present invention provides for a gear suspension system that permits movement of a gear (a ring gear), such as a spiral bevel or hypoid gear relative to its pinion in six degrees of freedom. The invention permits the computerized control of servo-actuators in response to input positioning control signals, and chaning the control signals while the pinion is being powered to rotate the gear. The gear can be loaded in a suitable manner, such as by a brake, for the gear set testing under a load.

Although the present invention will be described with respect to a hypoid or spiral bevel gear tester, principals forming the present invention are equally suited for testing other types of gears. Therefore, it is to be understood that the present invention is not limited to nor intended to be limited to a gear tester for hypoid or spiral bevel gears.

Embodied as hypoid or spiral bevel gear tester, the present invention allows the gear to be moved relative to the pinion after set at a nominal setting. The apparatus permits controlling movement of the gear along the gear rotational axis, which is essentially the gear rotational axis, that determines the backlash; controlling the shaft angle; controlling the hypoid or spiral bevel offset, or V position; and the position of the gear axis along the pinion axis or H position.

The gear is further mounted to a gear carriage. The carriage is supported by a plurality of actuators. In the preferred embodiment, six actuators are connected between the support structure and the gear carriage to form three universal pivotal connection joints on each element. The connection joints are angularly disposed from each other by 120 degrees an lie tangent to a common circle. The actuators can be operated in response to computer controls in a known manner to precisely relate the position of the gear to the fixed position of the pinion under variable loading conditions. In addition to controlling the actuators, the computer can control the speed of rotation of the pinion and thus the gear and the load applied to the gear. Torque sensing also can be provided for determining the loads on the gear and pinion.

BRIEF DESCRIPTION OF THE DRAWINGS

FIG. 2 is a top plan view of the tester of FIG. 1;

DETAILED DESCRIPTION OF THE PREFERRED EMBODIMENTS

Figure 1:
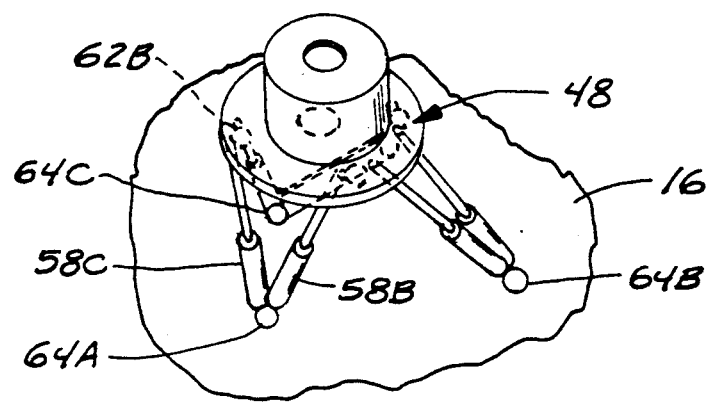
FIG. 1 is a partial perspective view of a gear testing system having six degrees of freedom for the gear support relative to the pinion and incorporating the features of the present invention.
Figure 3:
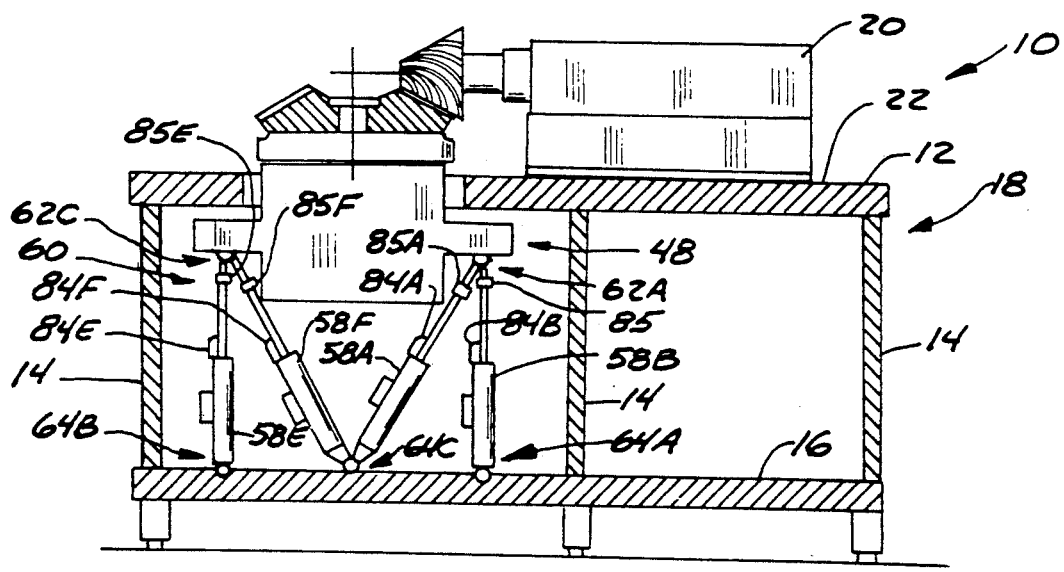
FIG. 3 is a side sectional view of the tester taken generally along line 3—3 in FIG. 1.

A gear tester of the present invention is illustrated in FIGS. 1 through 3 generally at 10. A support frame or table 12 is mounted on suitable walls 14, which in turn are mounted on a base 16. The base 16, columns 14 and table 12 make a stable support structure 18 for elements of the present invention. The structure 18 supports a pinion spindle housing 20 for movement in two mutually perpendicular axes in a plane parallel to an upper surface 22 of the table 12 to obtain coarse settings of the pinion.

When the gear testing system such as that shown in the present disclosure is initially set up, the procedure has to be considered as a two step operation. First, there are coarse settings which would establish relative orientation of the pinion axis versus the gear axis. For the pinion, this setting involves positioning the pinion housing 20 on the table 12. Whereas, the coarse setting for the gear is the height of the gear arbor. In these positions, the pinion and gear are close enough to the desired positions of the pinion and gear spindle to permit the gears to run. Since the accuracy of these settings is not very high, further adjustment is required to improve the relative position of the gears. This is done by a second positioning procedure called the fine settings movement. The operator has to establish the amount of movement to be produced by the fine setting mechanism upon the gear and thus has to determine the deviation of the setting after the coarse adjustment. The gear positions have to be measured and compared with the desired position. Both the coarse settings and the fine settings are described in detail in my co-pending application entitled CONTROLLABLE GEAR TESTING SYSTEM filed the same day as the present application and which is hereby incorporated by reference.

Figure 7:
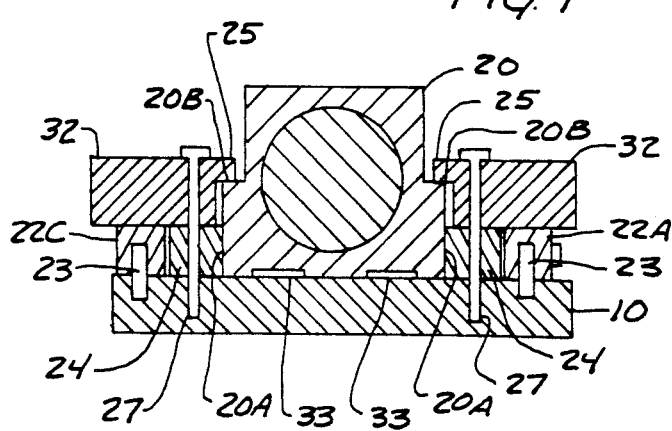
FIG. 7 is a sectional view of a portion of the tester taken along line 7—7 in FIG. 2.

Referring to FIGS. 2 and 7, the pinion spindle housing 20 is located within four guide rails 22A, 22B, 22C and 22D that are connected together to form a guide rail frame 21. The guide rail frame 21 is secured to the table 10 with mounting pegs 23. Replaceable spacer bars 24 disposed between side edges 20A of the pinion spindle housing 20 and the side guide rail 22A and 22C orient the pinion spindle housing 20 substantially parallel to a longitudinal axis 26 of a pinion spindle 28 and pinion 30 to obtain the coarse setting of the pinion. Typically, the pinion 30 and its shaft 28 are manufactured as a single piece.

Clamping bars 32 positioned over the side guide rails 22A and 22C and the spacer bars 24 secure the pinion spindle housing 20 to the table 10. Each clamping bar 32 includes an extending edge 25 that engages corresponding flanges 20B of the pinion spindle housing 20. Mounting bolts 27 through the clamping bars 32 and the spacer bars 24 secure the position of the pinion spindle housing 20 to the table 10. As illustrated, sufficient contact between the clamping bars 14 and the pinion spindle housing 20 is maintained on flanges 20B, while allowing the spacer bars 24 to be replaced when desired to allow transverse movement of the pinion spindle housing 20 in the directions indicated by double arrow 29 to obtain the coarse setting. In addition, the pinion spindle housing 20 has a longitudinal length less than the distance between guide rails 22B and 22D to allow longitudinal positioning of the pinion spindle housing 20 in the directions indicated by double arrow 31.

In the embodiment as illustrated, coarse positioning of the pinion spindle housing 20 is made easier through pneumatic lifts. With the clamping bars 32 removed, air from a suitable compressor, not shown, is forced into recesses 33 formed within the base plate of the pinion spindle housing 20. The forced air within recesses 33 causes upward movement of the pinion spindle housing 20, allowing convenient relocation of the pinion spindle housing 20 on the table 10. When the desired position of the pinion spindle housing 20 has been obtained, air pressure is removed within recesses 33 to lower the pinion spindle housing 20 onto the table 10. As described above, suitable spacer bars 32 are then located between the pinion spindle housing 20 and the guide rails with the clamping bars 32 securing the assembly to the table 10.

Pinion spindle housing 20 further carries a motor of suitable power indicated generally at 38, which in turn drives a pulley and belt drive 40 to drive a shaft 42 that is coupled to the pinion spindle 28. A optical shaft speed encoder 43 is provided to determine the pinion spindle 28 rotational speed. The motor 38 is controllable as to speed, through controls of which will be explained below, and has adequate power to load the pinion 30 as well as a gear indicated generally at 44, that are to be tested.

The gear 44 is mounted to a gear spindle 46 in a suitable way, while the gear spindle 46 is mounted in a gear carriage 48 using suitable bearings. The gear carriage 48 is independent of the structure 18, but is supported relative thereto, and in this instance the gear carriage 48 is supported with six degrees of freedom relative to the fixed position of the pinion 30, after nominal settings have taken place.

The gear 44 has a central axis 50 that is the center of the gear spindle 46 which is offset from the axis 26, as illustrated in FIG. 2. A gear back surface indicated at 52 of gear 44 is also mounted by a distance 54 from the pinion axis 26. The distance indicated by the arrow 54 is commonly known as the gear mounting distance, which determines the backlash. An angle indicated by arrow 56, between the gear axis 50 and the plane containing the pinion axis 26 is known as the shaft angle.

Referring to FIGS. 1 and 3, the gear carriage 48 is supported on six servo-controlled actuators 58A, 58B, 58C, 58D, 58E and 58F. The actuators 58A through 58F are joined to the base 16 and the carriage 48 to form an actuator support system 60 commonly known as a "Stewart System". The Stewart system is a generally known method of interconnecting actuators, which is described in A PLATFORM WITH SIX DEGREES OF FREEDOM, authored by D. Stewart and published in *The Institution of Mechanical Engineers* (Proceedings 1965-66, Vol. 180, Pt. 1, No. 15, pp. 371-86), which is herein incorporated by reference.

The actuators 58A through 58F are connected together to form three connection joints 62A, 62B and 62C to the carriage 48, while opposed ends of the actuators 58A through 58F are connected together to form frame connection points 64A, 64B and 64C to the base 16. Specifically, connection joints 62A through 62C are joined to carriage 48 angularly displaced from one another by 120 degrees, wherein connection joint 62A is formed with ends of actuators 58A and 58B, connection joint 62B is formed with ends of actuators 58C and 58D and connection joint 62C is formed with ends of actuators 58E and 58F. Similarly, connection joints 64A through 64C are each angularly displaced from one another by 120 degrees, wherein connection joint 64A is formed from ends of actuators 58B and 58C, connection joint 64B is formed from ends of actuators 58D and 58E and connection joint 64C is formed from ends of actuators 58A and 58F. Each of the aforementioned connection joints 62A through 62C, and 64A through 64C comprise universal pivoting connections allowing movement along and about three mutually orthogonal axes.

Controlling the actuators 58A through 58F allows the connection joint 62A through 62C and the carriage 48 to be moved with six degrees of motion relative to the fixed connection joints 64A through 64C and of base 16. Specifically, if the three connection joints 62A through 62C are moved similarly in the X-Y-Z coordinates, the three linear motions of the carriage 48 are obtained, and if the connection joints 62A through 62C are moved in the X-Y-Z coordinates differentially, then the three angular motions of the carriage 48 are obtained.

Figure 5:
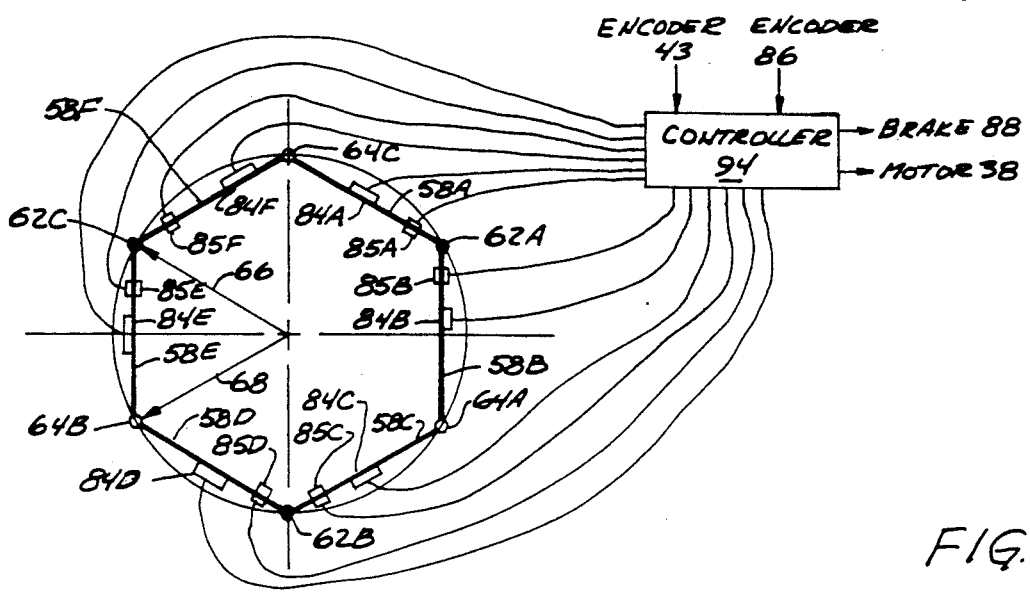
FIG. 5 is a schematic representation for placement of actuators in the tester.

Referring to FIG. 5, the actuators 58A through 58F and the connection joints 62A through 62C and 64A through 64C are illustrated schematically. In this embodiment, the connection joints 62A through 62C each lie in a plane tangential to a circle defined by a radius indicated by arrow 66. Similarly, the connection joints 64A through 64C of the base 16 each lie in a plane tangential to a circle defined by a radius indicated by arrow 68. In this embodiment, the radius 66 and the radius 68 are equal.

Figure 6:
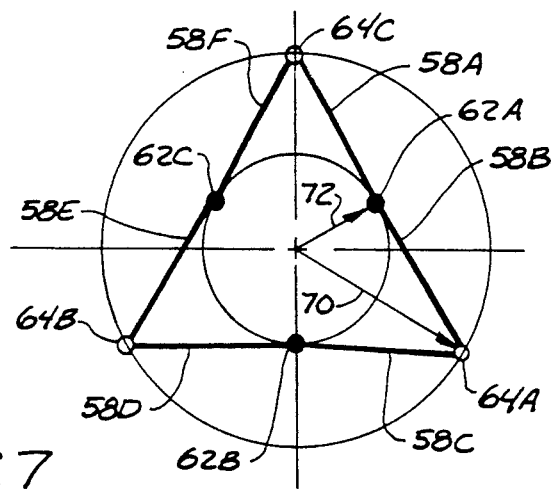
FIG. 6 is a schematic representation for placement of actuators in a second embodiment of the gear tester.

FIG. 6 illustrates a second embodiment for interconnection of the actuators 58A through 58F. In this form, the connection joints 64A through 64C each lie tangential to a circle formed by a radius indicated by arrow 70. Whereas, the connection joints 62A through 62C lie tangential to a circle defined by a radius indicated by arrow 72, which is less than the radius indicated by arrow 70. Again, each of the connection joints 62A through 62C and 64A through 64C are located on the carriage 48 and the base 16, respectively, separated from corresponding connection joints by 120 degrees.

The interconnected actuator system 60 described above permits the gear 44 to be moved with six degrees of freedom relative to the fixed pinion 30. Specifically, the actuators 58A through 58F can be controlled in a conventional manner to adjust the gear mounting distance 54 and the shaft angle 56. In addition, the system 60 can move the gear 44 in a direction indicated by arrow 74, which is the distance of the gear axis 50 from a reference plane at the pinion support surface 78 typically referred to as the H position. Similarly, the support system 60 can move the gear 44 in a direction indicated by arrow 80, which is the offset of the pinion axis 26 relative to the gear axis 50 typically referred to as the V position or hypoid offset.

In addition to the aforementioned four degrees of freedom for gear 44 relative to pinion 30, the actuators 58A through 58F of the actuator system 60 can move the gear 44 in two additional degrees of freedom. Specifically, these two degrees of freedom include rotation of the gear 44 about the pinion axis 26 and rotation of the gear 44 about its own axis 50.

Figure 4:
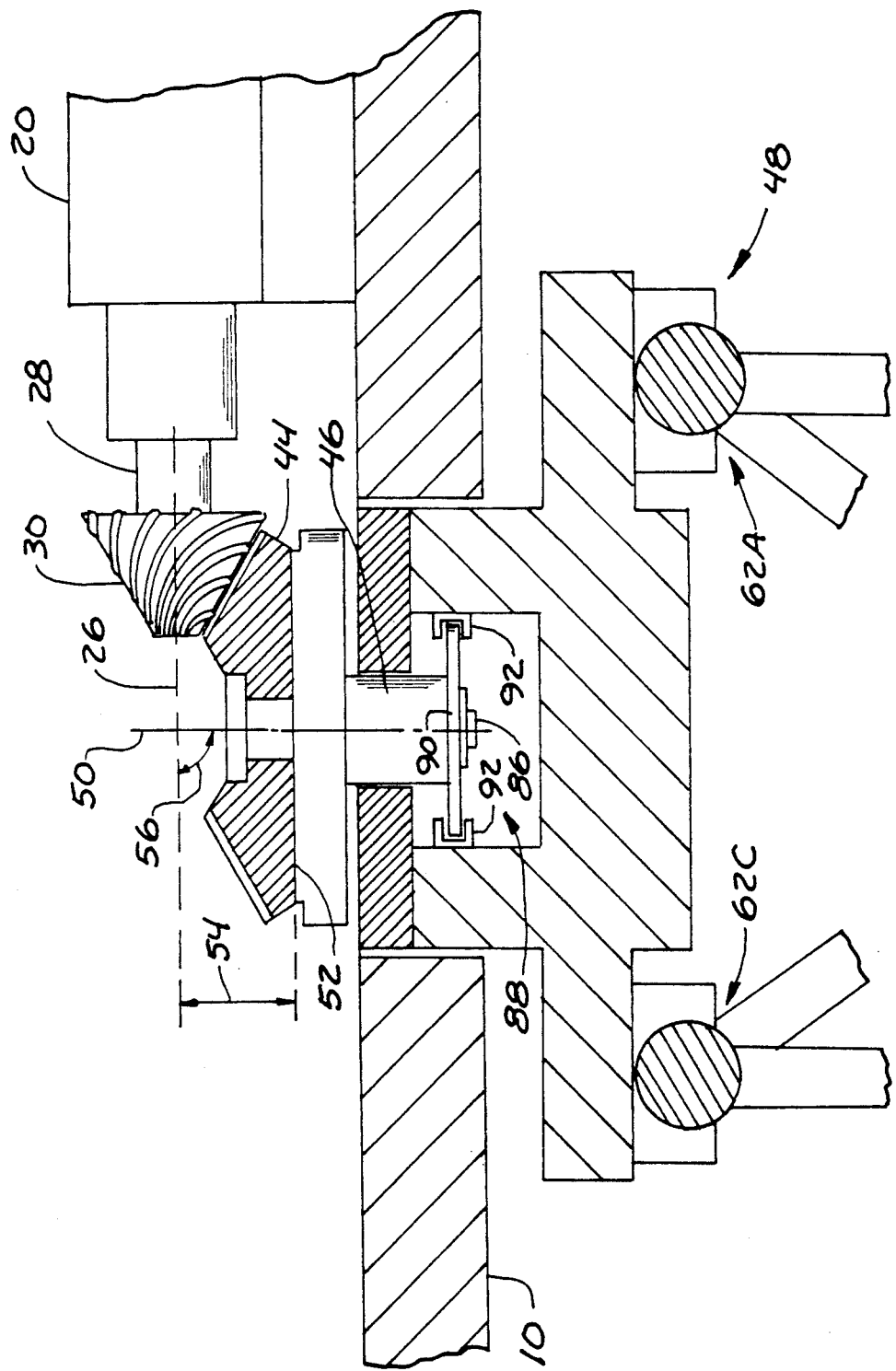
FIG. 4 is an enlarged side sectional view of the tester.

The position of each actuator 58A through 58F is defined by a built-in LVDT or position sensor 84A, 84B, 84C, 84D, 84E and 84F. In addition to these positional sensors, rotational sensors are provided to measure rotation of the pinion 30 and the gear 44. The motor encoder 42 has been previously described and determines the pinion 30 of rotational speed. The gear spindle 46 has an optical encoder indicated schematically at 86 in FIG. 4. The spindle 46 further includes a brake assembly 88, comprising a brake disc 90 and calibers 92. Feedback signals from sensors 84A through 84F, encoder 42 and encoder 86 are provided to a digital control system 94. Digital control system 94 uses these signals to place loads on the gears through brake assembly 88 or adjusts the speed of the gears through motor 38, as well as adjusts the position of the gear 44 relative to the fixed pinion 30. Conventional load cells 85A, 85B, 85C, 85D, 85E and 85F can be connected to each actuator to measure forces and provide an output signal to the digital controller 94.

A network to the digital controller 94 can be applied. The optical encoders 42 and 86 measure the transmission errors and accelerometers can be utilized to measure vibration. Microphones can be used to analyze the acoustic noise and different positions of the gear relative to the pinion can be tried with different results being recorded. In this manner, gear sets can be provided with specific mounting positions for minimizing noise, and comparative tests also can be run to determine if one gear cutting machine, for example is providing noisier or more vibration plague to gear sets than others. The gear spindle 46 is always held parallel to the gear carriage plane, and is moved in a dynamic manner in response to a program of remote parameters, for example so that tooth pattern, noise, vibration and other factors can be evaluated. Further, gear box deflections can be evaluated and simulated by movement of the aforementioned actuators. Of course, suitable standards can be applied so that the results can be compared.

Although the present invention has been described with reference to preferred embodiments, workers skilled in the art will recognize that changes may be made in form and detail without departing from the spirit and scope of the invention.

What is claimed is:

1. An apparatus for testing and adjusting a position of a first gear with respect to a second gear relative to three substantially orthogonal axes, the first gear driving the second gear with the first gear driven by a rotational drive, the apparatus comprising:

a frame on which the first gear and the rotational drive are mounted;

a carriage for supporting the second gear for rotation about a central axis;

actuator means connected to the frame for supporting the carriage relative to the first gear, the actuator means allowing movement of the second gear linearly along and rotationally about the three substantially orthogonal axes, wherein the actuator means is disposed on the frame to form three frame connection joints, and wherein the actuator means is disposed on the carriage to form three carriage connection joints; and sensing means to determine relative displacement of the second gear with respect to the first gear.

2. The apparatus of claim 1 wherein the frame connections are angularly disposed from each other frame connection joint by 120 degrees, and wherein the carriage connections are angularly disposed from each other carriage connection joint by 120 degrees.

3. The apparatus of claim 2 wherein the frame connections are disposed tangentially to a common frame circle, and wherein the carriage connections are disposed tangentially to a common carriage circle.

4. The apparatus of claim 3 wherein the radius of the carriage circle is smaller than the radius of the frame circle.

5. The apparatus of claim 1 and further comprising loading means connected to the second gear to apply selective brake loads.

6. The apparatus of claim 1 and further comprising control means connected to the actuator means and to the sensing means, the control means controlling displacement of the second gear.

7. The apparatus of claim 1 wherein the actuator means comprises six actuators.

8. An apparatus for testing and adjusting a position of a first gear with respect to a second gear relative to three substantially orthogonal axes, the first gear driving the second gear with the first gear driven by a rotational drive, the apparatus comprising:
a frame on which the first gear and the rotational drive are mounted;
a carriage for supporting the second gear for rotation about a central axis;
a plurality of actuator means connected to the frame for supporting the carriage relative to the first gear, the actuator means allowing movement of the second gear linearly along and rotationally about the three substantially orthogonal axes, wherein the actuator means is disposed on the frame to form three frame connection joints, and wherein the actuator are disposed on the carriage to form three carriage connection joints;
sensing means to determine relative displacement of the second gear with the first gear; and
control means connected to the actuators and to the sensing means, the control means controlling displacement of the second gear.

9. The apparatus of claim 8 wherein the frame connections are angularly disposed from each other frame connection joint by 120 degrees, and wherein the carriage connections are angularly disposed from each other carriage connection joint by 120 degrees.

10. The apparatus of claim 9 wherein the frame connections are disposed tangentially to a common frame circle, and wherein the carriage connections are disposed tangentially to a common carriage circle.

11. The apparatus of claim 10 wherein the radius of the carriage circle is smaller than the radius of the frame circle.

* * * * *

UNITED STATES PATENT AND TRADEMARK OFFICE
CERTIFICATE OF CORRECTION

PATENT NO. : 5,207,097
DATED : May 4, 1993
INVENTOR(S) : YEVSEY GUTMAN

It is certified that error appears in the above-identified patent and that said Letters Patent is hereby corrected as shown below:

Col. 8, line 1, delete "actuator means", insert --actuators--

Col. 8, line 3, delete "actuator means", insert --actuators--

Col. 8, line 6, delete "actuator means is",
insert --actuators are--

Col. 8, line 8, delete "actuator", insert --actuators--

Signed and Sealed this

First Day of February, 1994

Attest:

BRUCE LEHMAN

Attesting Officer     Commissioner of Patents and Trademarks